July 21, 1959  E. F. G. HANEBECK  2,895,571
EXHAUST BRAKING APPARATUS FOR MOTOR VEHICLES
Filed Feb. 25, 1955  3 Sheets-Sheet 1

Inventor
Emil F. G. Hanebeck
By
Attorneys

July 21, 1959  E. F. G. HANEBECK  2,895,571
EXHAUST BRAKING APPARATUS FOR MOTOR VEHICLES
Filed Feb. 25, 1955  3 Sheets-Sheet 2

Inventor
Emil F. G. Hanebeck
By
Attorneys

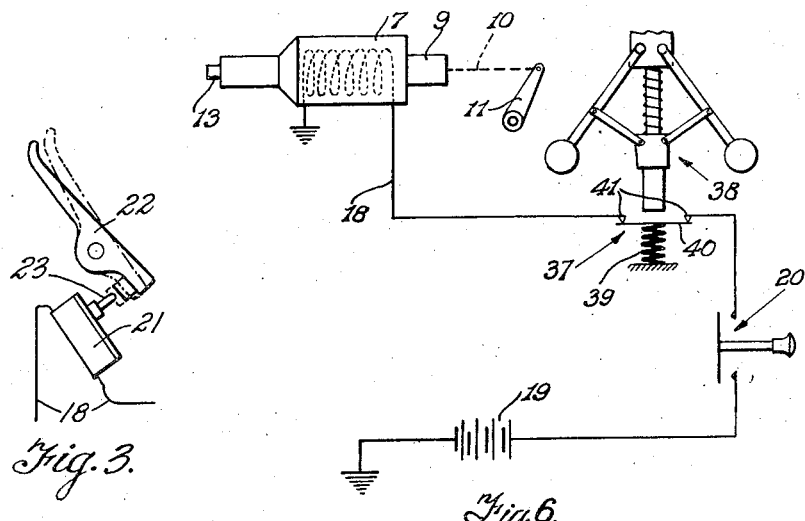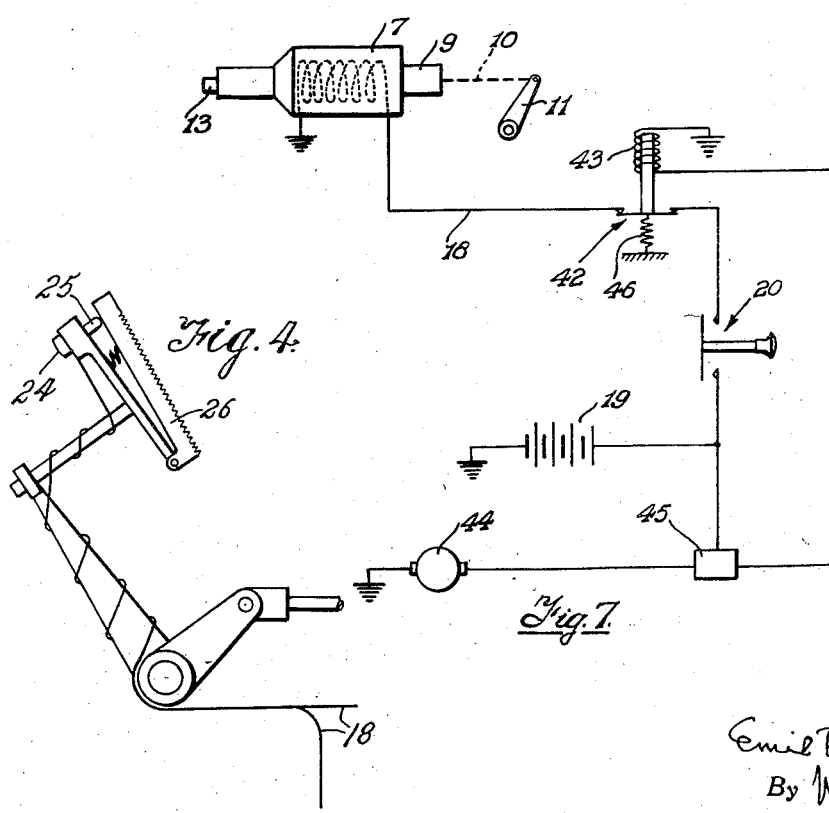

United States Patent Office 2,895,571
Patented July 21, 1959

2,895,571

EXHAUST BRAKING APPARATUS FOR MOTOR VEHICLES

Emil Friedrich Gottlieb Hanebeck, Gerrards Cross, England, assignor to Clayton Dewandre Company Limited, Lincoln, England Application February 25, 1955, Serial No. 490,626

12 Claims. (Cl. 188—99)

This invention relates to exhaust braking apparatus for motor vehicles, i.e. apparatus which effects the retardation of a vehicle by restricting the escape of its engine's exhaust gas. This is accomplished by means of a throttle valve or other closure member disposed in the path of the exhaust gas and operable wholly or partially to close the exhaust outlet so as to cause a back pressure to be built up therein, thus slowing down the engine and, through the transmission, retarding the vehicle.

The invention has particular reference to exhaust braking apparatus of the kind which employs a rotatable closure member mounted in the exhaust duct and operated by a mechanism outside the duct through the intermediary of a shaft which is rotatably supported in the wall of the duct and which extends externally thereof for connection with the operating mechanism.

The object of the invention is to provide an improved operating mechanism for such apparatus.

The invention provides an exhaust braking apparatus for a motor vehicle, comprising an exhaust gas duct, a rotatable closure member therein, an operating shaft for said closure member rotatably supported in the wall of the duct and extending externally thereof, spring means mounted externally of the duct and acting through said shaft to urge the closure member into the fully open position, and an electro-magnetic device mounted externally of the duct and operable, when energized, to overcome the opposing force of said spring means and, through the intermediary of said shaft, move the closure member into a closed position, said spring means being so constructed that the rate thereof increases during movement of the closure member towards closed position.

Provision can be made to ensure that when the exhaust brake is in the fully operative position sufficient exhaust gas can escape to prevent stalling of the engine. this can be achieved by arranging the closure member so that it is never completely shut. Alternatively, means can be provided which are responsive to the pressure on the upstream side of the closure member and which are operable to cause the latter to be opened at least partially when that pressure falls to a predetermined value. In a third arrangement means are provided which are responsive to the speed of the engine and which are operable to cause the closure member to be opened at least partially before the engine is reduced to idling speed.

Reference will now be made to the accompanying drawings in which.

Figure 1:
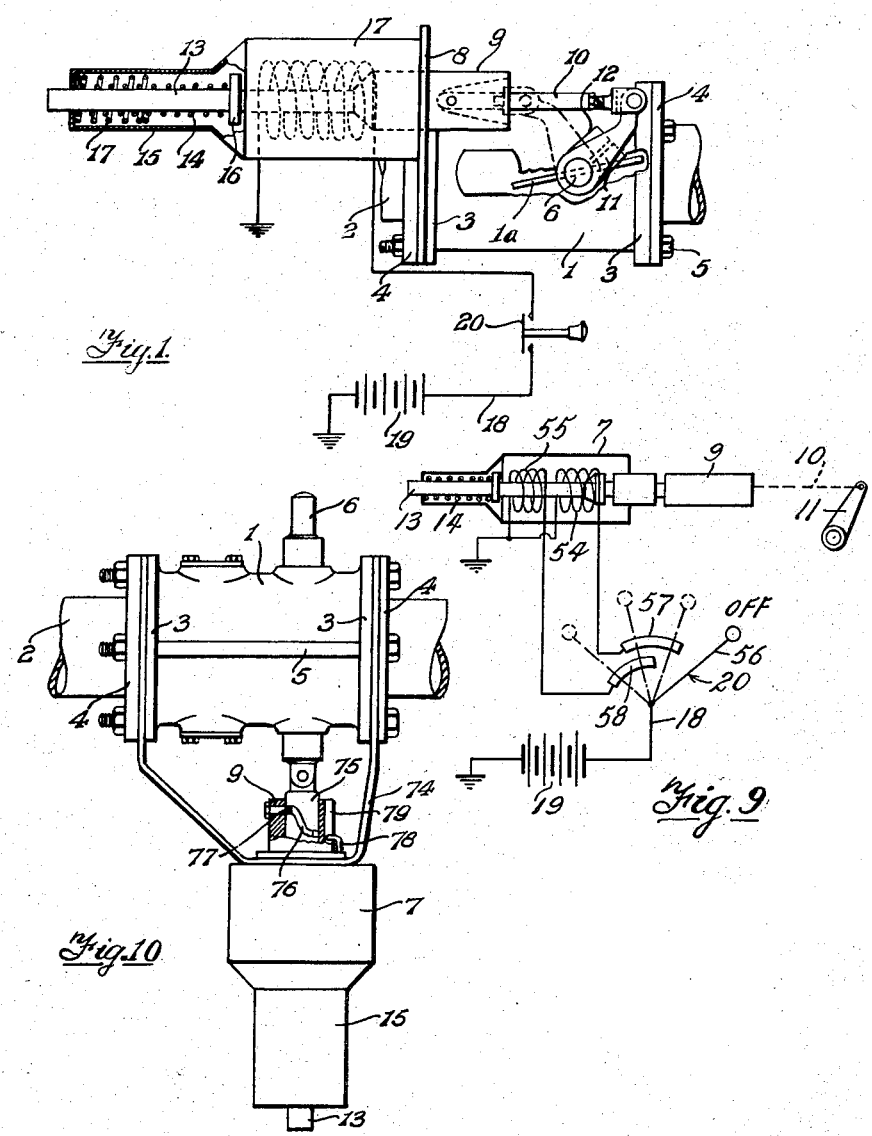
Fig. 1 is a side view of one embodiment of the invention.
Figure 2:
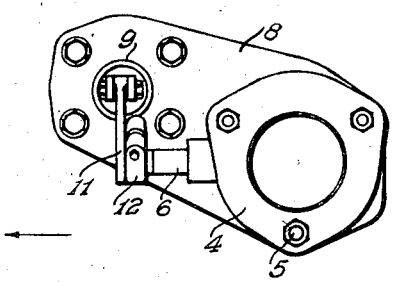
Fig. 2 is an end view looking toward the left in Fig. 1.
Figure 5:
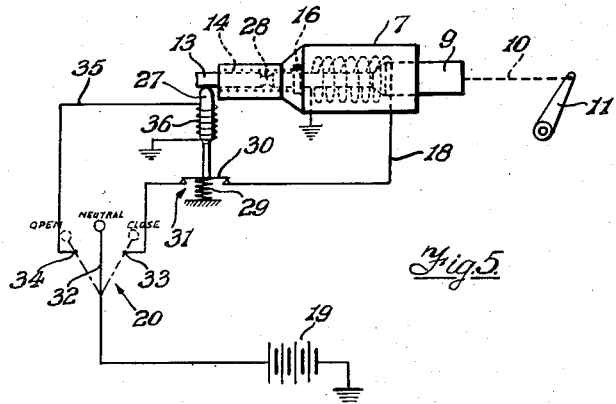
Figure 8:
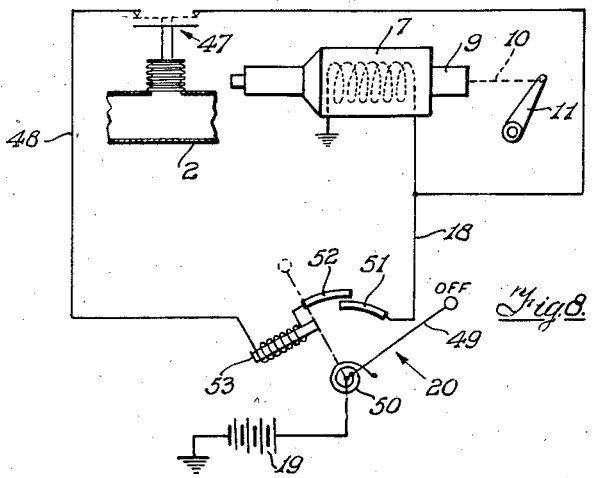

Figs. 3 and 4 are fragmentary illustrations of two alternative methods of controlling the operation of the mechanism, Fig. 5 is a diagrammatic illustration of means which are provided for locking the closure member in its closed position, Figs. 6, 7 and 8 are diagrammatic illustrations of three alternative means for causing the closure member to be automatically reopened if there is a danger of it causing the engine to stall when the engine is in an idling condition following an operation of the closure member, Fig. 9 is a diagrammatic illustration of a further embodiment of the invention, and Fig. 10 is a plan view of a modification of the embodiment shown in Figs. 1 and 2.

In the embodiment illustrated the exhaust brake valve unit is of known form and consists of a rotatable closure member (not shown) of the butterfly type freely journalled in a tubular housing 1 which is interposed in the exhaust pipe 2 upstream of the silencer. The ends of the housing are flanged as indicated at 3 to mate with flanges 4 on the adjacent ends of the exhaust-pipe sections. Asbestos packing is provided between the flanges, and the housing is held in position by bolts 5. The butterfly valve is operated by the operating mechanism, which is mounted externally of the exhaust duct, through the intermediary of a shaft 6 journalled in and extending through the wall of the valve housing on the downstream or low-pressure side of the valve and having a mechanical connection with the valve such that when the shaft is rotated in one direction or the other by the operating mechanism the valve is opened or closed accordingly.

The valve can be arranged to pivot about a diametric axis, in which case it is balanced with respect to the exhaust gas pressure acting on it when it is closed, or about an axis offset from its diameter so that the exhaust gas pressure will tend to open the valve. This pressure is at a maximum when the valve is fully closed and falls off as the valve is opened, reaching a minimum when the valve is fully opened.

In the embodiment shown in Figs. 1 and 2 the closing of the valve is effected by a solenoid 7 supported parallel to the exhaust pipe by a plate 8 which is clamped between the flange at one end of the valve housing and the adjacent flange on the exhaust pipe. The movements of the core 9 of the solenoid are transmitted to the valve-operating shaft 6 through a rod 10 pivotally connected at one end to the outer end of the core 9 and at the other end to a lever 11 fixed on the shaft 6 externally of the valve housing 1. The lever 11 is secured on the shaft by a split circular clamp 12 which enables the lever to be angularly adjusted in relation to the valve.

Projecting co-axially from the inner end of the core of the solenoid is a rod 13 which extends through a compression spring 14 housed in an extension 15 of the casing of the solenoid. The spring is held between the end of its housing and a collar 16 on the rod 13 so that it exerts a force through the core 9, rod 10, lever 11 and shaft 6 urging the valve into its open position. For a purpose to be described later herein the spring is one whose rate increases with compression. Alternatively, a second compression spring 17 preferably stiffer than the first can be employed, the second spring being arranged so that it is effective only in the initial valve-opening stages.

The solenoid is connected into a circuit 18 with the vehicle's battery 19, or dynamo, and a control switch 20 which can be mounted on the dashboard or steering column for operation at will by the driver.

Two alternative methods of controlling the operation of the solenoid are illustrated in Figs. 3 and 4. In one (Fig. 3) the solenoid is operated automatically upon release of the vehicle's accelerator pedal. This is achieved by means of a switch 21 mounted adjacent the pedal 22 and operated through the intermediary of a plunger 23 which is adapted to be depressed by the accelerator pedal so as to close the switch when the pedal is released (as shown in dotted lines in Fig. 3). In the method shown in Fig. 4 the operation of the solenoid is controlled by a switch 24 mounted on the vehicle's brake pedal, the arrangement being such that the exhaust brake valve is brought into operation prior to the application of the wheel brakes. The switch is operated through the intermediary of a plunger 25 which is adapted to be depressed by means of a hinged plate 26 when the driver places his foot on the pedal, the depression of the plunger closing the switch.

If the operation of the solenoid is controlled from the accelerator pedal or the brake pedal a master switch is preferably interposed in the circuit 18 to enable the mechanism to be rendered inoperative at will by the driver.

In the operation of the mechanism the closing of the control switch 20 completes the circuit 18 and thus energises the solenoid. The core 9 is pulled into the coil against the resistance of the spring 14, and eventually the second spring 17 where used, and through the rod 10 and lever 11 rotates the shaft 6 to close the valve. The position of the lever 11 when the valve is fully closed is shown in dot-dash lines in Fig. 1. When the switch is opened again the solenoid is de-energised to permit the spring, or springs, acting through the core 9, the rod 10, lever 11 and shaft 6, to reopen the valve.

In the case where the valve is balanced about its pivotal axis with respect to the exhaust gas pressure acting on it when closed, the force needed to overcome this pressure and initiate the opening movement of the valve is greater than that required to complete the opening movement. The extra force required is provided in the above-mentioned use of a single spring whose rate increases as the valve is moved towards the closed position or an assembly of two springs arranged so that the rate of the assembly increases in the latter part of the closing movement of the valve. This permits the use of a less powerful solenoid, and therefore a lower operating current, than would be required if a sufficiently strong single spring of uniform rate were employed. By using two springs or a single spring of varying rate, the resistance to the electro-magnetic pull on the core of the solenoid when this pull is at its weakest, that is, at the commencement of the operation of the solenoid, is much lower than it would be if a single spring of uniform rate designed to give the same initial valve-opening force were employed. The use of two springs or a single spring of varying rate naturally produces an increasing "stiffness" in the resistance to the closing of the valve but this is countered by the increased magnetic pull on the core as it is drawn further into the coil. This stiffening of the spring resistance has an advantage in that it prevents the solenoid closing the valve with an impact.

In order to reduce the power consumption when the apparatus is required to remain in operation uninterruptedly for any length of time, such as when the vehicle is descending a long gradient, means are provided for locking the valve mechanically in its closed position. In one form, as illustrated diagrammatically in Fig. 5, these means consist of a pin 27 which is engageable with a circumferential groove or detent 28 in the extension rod 13 of the core 9 of the solenoid when the core is in its retracted or operative position within the solenoid, i.e. when the exhaust brake valve is closed. The pin, which is pressed against the rod 13 by a spring 29, carries the movable contact 30 of a switch 31 interposed in the circuit 18. When the core 9 is in its inoperative position as shown in Fig. 5, i.e. when the exhaust brake valve is open, the switch 31 is maintained closed by the abutment of the pin 27 against the rod 13 and thus holds the circuit 18 in readiness for completion by the main control switch 20. To close the valve the movable contact 32 of the control switch 20 is engaged with a fixed contact 33 thereof to complete the circuit 18 and energise the solenoid 7. When the core 9 reaches its operative position and the valve is closed, the pin 27 enters the groove 28 in the rod 13, thus locking the core, and therefore the valve, in their operative positions and simultaneously opening the switch 31 to interrupt the circuit 18 so that no further power is consumed. The movable contact 32 of the control switch can then be returned to a neutral position. Spring means can be provided to urge the contact 32 into this neutral position.

To reopen the valve the contact 32 is engaged with a fixed contact 34 to complete a circuit 35 through which is energised a solenoid 36 acting on the pin 27. The energisation of this solenoid effects the withdrawal of the pin from the groove 28 so as to release the core 9 for movement by the spring 14 to its inoperative position, thus reopening the valve, and simultaneously to close the switch 31 to prepare the circuit 18 for the further operation of the valve. The contact 32 can then be returned to neutral position to de-energise the solenoid 36, the switch 31 being held in the closed condition by the abutment of the pin 27 against the rod 13.

As the engine is liable to stall if the exhaust brake valve is allowed to remain closed when the engine is idling following an operation of the valve, means are provided for causing the valve to be automatically reopened in the event of this danger arising. In one form, as illustrated diagrammatically in Fig. 6, these means consist of a switch 37 interposed in the circuit 18 and operated by a centrifugal device 38 responsive to the speed of the engine. When the speed of the engine is above a predetermined value, which may be idling speed or just above, the centrifugal device permits the switch to be maintained closed, for example by a spring 39, so as to hold the circuit 18 in readiness for completion by the control switch 20 when it is required to operate the valve. When, as a result of the operation of the valve, the speed of the engine falls to the predetermined value, the centrifugal device disengages the movable contact 40 of the switch 37 from the fixed contacts 41 thereof and thus interrupts the circuit 18 so that the solenoid 7 is de-energised and the valve reopened.

In another form, as illustrated diagrammatically in Fig. 7, the means for causing the valve to be automatically reopened when the engine is reduced to idling speed consist of a switch 42 interposed in the circuit 18 and operated by a solenoid 43 which is energised by the vehicle's dynamo 44 through the normal cut-out switch 45 provided between the dynamo and the battery. At normal running speeds, when the cut-out switch 45 remains closed, the solenoid 43 is energised to maintain the switch 42 closed so that the circuit 18 is ready for completion by the control switch 20 when it is required to operate the valve. When, as a result of the operation of the valve, the engine is brought to an idling condition, the cut-out switch 45 opens in the normal course of its operation and de-energises the solenoid 43. The switch 42 is consequently opened, for example by a spring 46, and thus interrupts the circuit 18 so that the solenoid 7 is denergised and the valve reopened.

In a third form, as illustrated in Fig. 8, the said means consist of a pressure-operated switch 47 responsive to the pressure of the gas in the exhaust pipe 2 on the upstream side of the valve and interposed in a circuit 48 which is connected with the main circuit 18 through the main control switch 20. The latter has a movable contact 49 which is urged into the "off" position by a spring 50, and two overlapping arcuate or segmental fixed contacts 51 and 52 in the circuits 18 and 48 respectively. To close the valve the movable contact 49 is engaged with the fixed contact 51 in the main circuit 18, thus completing this circuit and energising the solenoid 7. The contact 49 is then moved on to engage the contact 52 in the circuit 48 while still in engagement with the contact 51 in the main circuit. Meanwhile, the pressure which is being built up in the exhaust gas upstream of the valve as a result of the latter's operation is acting on the switch 47. When it exceeds a predetermined value at which this switch is set to operate, and which may correspond to the idling condition of the engine, the pressure closes the switch to complete the circuit 48. The solenoid is now energised through both of the circuits 18 and 48. The contact 49 is then moved on past the contact 51 so that the main circuit 18 is interrupted and the solenoid 7 is engaged through the circuit 48 only. The contact 49 is held in this final position by an electromagnet 53 which is energised through the circuit 48. As the speed of the engine is reduced following the operation of the valve the exhaust gas pressure upstream of the valve is reduced accordingly, and when it reaches the aforesaid predetermined value the switch 47 opens and thus interrupts the circuit 48 so that the solenoid 7 is de-energised and the valve reopened. The interruption of the circuit 48 also de-energises the electro-magnetic 53 with the result that the movable contact 49 of the control switch 20 is released for movement back to the "off" position by the spring 50. In returning to the "off" position the contact 49 engages the contact 51 and causes a momentary re-energization of the solenoid 7, but this is too brief to be of any consequence.

The fixed contact 52 in the circuit 48 overlaps the contact 51 in the main circuit 18 sufficiently to ensure that, if the contact 49 is moved from the "off" position to the final "on" position in one continuous movement, the exhaust gas pressure closes the switch 47 to complete the circuit 48 before the contact 49 leaves the contact 51 to interrupt the circuit 18.

In the embodiment of the invention shown diagrammatically in Fig. 9 the valve-closing solenoid 7 has two separate coils 54 and 55 so that the valve can be closed either partially or fully according to requirements. The core 9 of the solenoid is divided, as shown, to suit the number of coils. The latter are connected in the circuit 18 through the control switch 20 which has a movable contact 56 and two overlapping arcuate or segmental fixed contacts 57 and 58 connected with the coils 54 and 55 respectively. If it is desired to effect only a partial closure of the exhaust outlet the contact 56 is engaged with the contact 57 so that only the first coil 54 is energised. If complete closure is required the contact 56 is moved on to engage the contact 58 so that the second coil 55 is brought into operation. The contact 58 controlling the second coil can be extended beyond the contact 57, as shown in the drawing, so that the contact 58 can be disengaged from the contact 57 while remaining in engagement with the contact 58, thus de-energising the first coil 54 and leaving only the second in operation to maintain the valve in the fully closed position.

In the modification illustrated in Fig. 10 the solenoid 7 is arranged co-axially with the valve-operating shaft 6. The solenoid is supported by a frame 74 which is clamped between the flanges 3 at the ends of the valve housing and the flanges 4 on the exhaust pipe. The core 9 of the solenoid is axially bored to receive with a sliding fit a rod 75 which is connected to the shaft 6 to form a co-axial extension thereof. In the surface of the rod 75 there is formed a helical groove 76 in which engages a pin 77 mounted in the core 9. In the operation of the solenoid the axial movement of the core 9 is converted by the pin 77 moving in the groove 76 into a rotational movement of the rod 75 and shaft 6. The core 9 is restricted to axial movement and prevented from rotating by a projection 78 fixed on the solenoid housing and engaging in a longitudinal groove 79 in the outer surface of the core. The spring or springs for returning the core to reopen the valve are contained in the extension 15 of the solenoid housing and have rate characteristics similar to those of the spring means described in the embodiment of Fig. 1. If desired the pin 77 can be provided on the rod 75 and the groove 76 formed in the core.

I claim:

1. An exhaust braking apparatus for a motor vehicle, comprising an exhaust gas duct, a rotatable closure member therein, an operating shaft for said closure member rotatably supported in the wall of the duct and extending exteriorly thereof, variable rate spring means mounted externally of the duct and normally acting through said shaft to urge the closure member toward the fully open position, and an electromagnetic device mounted externally of the duct and operable, when energized, to overcome the opposing force of said spring means and, through the intermediary of said shaft, move the closure member toward a closed position, said spring means being so constructed that the rate thereof sufficiently increases during movement of the closure member towards the closed position that the impact of closure of said member by said electromagnetic device is effectively reduced and the compressed spring exerts optimum closure member opening force when said electromagnetic device is denergized, said spring means comprising two springs one of which is active throughout the whole range of movement of the closure member and the other of which comes into action in the latter part of the closing movement of said closure member.

2. An exhaust braking apparatus as defined in claim 1, including a lever fixed to said shaft to project radially from one side thereof externally of the exhaust gas duct, and wherein said electro-magnetic device consists of a solenoid whose operative force is transmitted to said shaft through said lever and the force exerted by said spring means to open said closure member is also transmitted through said lever to said shaft.

3. An exhaust braking apparatus as defined in claim 1, wherein said electro-magnetic device consists of a solenoid mounted co-axially with said operating shaft for said closure member and having an axial bore formed in its core to receive an extension of said shaft, said core and extension of said shaft being formed one with a helical groove and the other with a projection engaging in said groove and operative, by operation of said solenoid, to convert axial movement of the solenoid core into rotational movement of said shaft.

4. An exhaust braking apparatus as defined in claim 1, including means for locking the closure member in closed position and for de-energizing said electro-magnetic device to thereby avoid prolonged consumption of power.

5. An exhaust braking apparatus as defined in claim 4, including an element movable with said closure member, and wherein said locking means comprises a device having spring means for urging it into locking engagement with said element when said element reaches a position corresponding to the closed position of the closure member and a solenoid operable, when energized, to disengage the locking device from said element and thereby free the closure member for movement to its open position.

6. An exhaust braking apparatus as defined in claim 4, including a circuit for energizing said electro-magnetic device and a switch in said circuit, and wherein said locking device is connected to said switch and acts when not in locking engagement with said element to maintain said switch closed and thereby prepare said circuit for completion, and including a second manually operable switch for completing said circuit, said locking device being automatically operable, when assuming locking engagement with said element, to open said switch connected thereto and thereby interrupt said circuit and de-energize said electro-magnetic device.

7. An exhaust braking apparatus as defined in claim 1, including means for reopening said closure member automatically to avoid stalling of the engine of the vehicle when the engine is brought to idling condition following a closing operation of the closure member.

8. An exhaust braking apparatus as defined in claim 7, wherein said reopening means for said closure member comprises a circuit having a switch interposed therein through which said electro-magnetic device for closing said closure member is energized, said switch being normally maintained closed to prepare said circuit for completion, a manually operable switch for completing said circuit, and means including a device responsive to the speed of the engine of the motor vehicle and automatically operable, in the event of said speed falling to a predetermined value to cause opening of the first mentioned switch to interrupt said circuit and thereby de-energize said electro-magnetic device and cause reopening of the closure member.

9. An exhaust braking apparatus as defined in claim 7 for a motor vehicle having an engine driven dynamo and a circuit cut-out switch therefor, including a circuit through which said electro-magnetic device for closing said closure member is energized, an electro-magnetic switch in said circuit for preparing said circuit for completion, a manually controlled switch for completing said circuit, a circuit connecting said electromagnetic switch with said cut-out switch and which is energized by the dynamo of the vehicle through said cut-out switch while closed to maintain said electro-magnetic switch closed, and said electro-magnetic switch being de-energized in response to an idling speed of the engine of the vehicle and opening of the cut-out switch following an operation of the closure member to cause said electro-magnetic switch to open and thereby interrupt the circuit for said electro-magnetic device and de-energize said device to cause reopening of the closure member.

10. An exhaust braking apparatus as defined in claim 7, including a circuit for energizing said electro-magnetic device, and wherein said means for reopening said closure member consists of a pressure-operated switch in said circuit and which is responsive to the pressure built up in the exhaust gas duct resulting from closing of said closure member, said pressure-operated switch being operable in response to a drop of pressure in the exhaust gas duct below a predetermined value following a closure of the closure member to cause interruption of the energizing circuit of said electro-magnetic device which operates the closure member and de-energization of said device to permit reopening of the closure member.

11. An exhaust braking apparatus as defined in claim 10, including a spring-actuated manually operable switch in the energizing circuit of said electro-magnetic device and having an electro-magnetic holding device, and wherein said pressure-operated switch is maintained closed by said pressure in the exhaust gas duct when it is above said predetermined value, and a circuit including said pressure-operated switch and said electro-magnetic holding device for holding said spring-actuated switch in closed position against the resistance of its spring action, said pressure-operated switch being responsive to a drop in said pressure below said predetermined value following an operation of the closure member to open and cause de-energization of said electro-magnetic holding device to release said spring-actuated switch for movement by its spring action to open position and thereby interrupt said energizing circuit and cause de-energization of the electro-magnetic device by which the closure member is closed.

12. An exhaust braking apparatus as defined in claim 11, including a power supply circuit in which said electro-magnetic device for closing said closure member and said manually operable switch are connected, and a second circuit connected to said power supply circuit and to which said pressure-operated switch, manually operable switch and holding device are connected for holding said manually operable switch in closed position, said manually operable switch being operable initially to complete said power supply circuit to energize said electro-magnetic device for closing the closure member, and subsequently, when said pressure-operated switch is closed by the pressure built up in the exhaust gas duct, to complete said second circuit to energize said electro-magnetic device by which the closure member is closed and to maintain energization thereof through said second circuit, said pressure-operated switch being adapted to open in response to a drop in pressure in the exhaust gas duct below said predetermined value to de-energize both of said electro-magnetic devises and cause both the closure member and said manually operable switch to be reopened.

References Cited in the file of this patent

UNITED STATES PATENTS

| | | |
|---|---|---|
| 1,483,658 | Glidden | Feb. 12, 1924 |
| 1,551,682 | Moore | Sept. 1, 1925 |
| 1,588,569 | Best | June 15, 1926 |
| 1,752,229 | Brueckel | Mar. 25, 1930 |
| 1,940,712 | Ertz | Dec. 26, 1933 |
| 2,168,232 | Messinger | Aug. 1, 1939 |
| 2,388,696 | Lacart et al | Nov. 13, 1945 |
| 2,436,992 | Ernst | Mar. 2, 1948 |
| 2,576,578 | Dalrymple | Nov. 27, 1951 |
| 2,705,608 | Phillips | Apr. 5, 1955 |
| 2,753,147 | Welge | July 3, 1956 |
| 2,781,115 | Slee | Feb. 12, 1957 |

FOREIGN PATENTS

| | | |
|---|---|---|
| 698,448 | Germany | 1940 |
| 805,823 | Germany | 1951 |